(12) United States Patent
Viswanathan et al.

(10) Patent No.: US 10,578,457 B2
(45) Date of Patent: Mar. 3, 2020

(54) ROBUST AND STABLE AUTONOMOUS VISION-INERTIAL NAVIGATION SYSTEM FOR UNMANNED VEHICLES

(71) Applicants: Sasi Prabhakaran Viswanathan, Syracuse, NY (US); Amit K. Sanyal, Manlius, NY (US)

(72) Inventors: Sasi Prabhakaran Viswanathan, Syracuse, NY (US); Amit K. Sanyal, Manlius, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 85 days.

(21) Appl. No.: 15/705,486

(22) Filed: Sep. 15, 2017

(65) Prior Publication Data

US 2018/0164124 A1 Jun. 14, 2018

Related U.S. Application Data

(60) Provisional application No. 62/394,898, filed on Sep. 15, 2016.

(51) Int. Cl.
| | |
|---|---|
| *B64C 39/00* | (2006.01) |
| *G01C 21/00* | (2006.01) |
| *B64D 47/08* | (2006.01) |
| *G01C 23/00* | (2006.01) |
| *B64C 39/02* | (2006.01) |
| *G01C 21/16* | (2006.01) |

(52) U.S. Cl.
CPC .......... *G01C 23/005* (2013.01); *B64C 39/024* (2013.01); *B64D 47/08* (2013.01); *G01C 21/165* (2013.01); *B64C 2201/027* (2013.01); *B64C 2201/108* (2013.01); *B64C 2201/141* (2013.01)

(58) Field of Classification Search
CPC .... G01C 23/005; G01C 21/165; B64C 39/024
See application file for complete search history.

(56) References Cited

U.S. PATENT DOCUMENTS

| 7,592,911 | B1 * | 9/2009 | Hudgens | G07C 9/00111 |
| | | | | 307/326 |
| 10,029,789 | B2 * | 7/2018 | Liu | B64C 39/024 |
| 10,029,804 | B1 * | 7/2018 | Chamberlain | B64D 45/08 |
| 2016/0271796 | A1 * | 9/2016 | Babu | G05D 1/0094 |
| 2016/0313742 | A1 * | 10/2016 | Wang | G05D 1/0669 |
| 2018/0231972 | A1 * | 8/2018 | Woon | G05D 1/104 |

\* cited by examiner

*Primary Examiner* — Yonel Beaulieu
(74) *Attorney, Agent, or Firm* — Bond Schoeneck & King, PLLC; David Nocilly; George McGuire

(57) ABSTRACT

An onboard robust and stable vision-inertial navigation system that makes an unmanned vehicle autonomous in its navigation capabilities in the absence of external navigation aids like a global positioning system (GPS). The system is robust to the sensor noise properties of the onboard vision and inertial sensors, as well as errors in initial estimates of the position and orientation of the vehicle. The system enables any unmanned vehicle to autonomously navigate an unfamiliar or unknown environment. The system is also stable and robust to uncertainties in the measurement noise and dynamics of the unmanned vehicle, and does not exhibit any instability when sensors are changed or when sensor noise properties change over time.

4 Claims, 7 Drawing Sheets

ROBUST AND STABLE AUTONOMOUS VISION-INERTIAL NAVIGATION SYSTEM FOR UNMANNED VEHICLES

CROSS-REFERENCE TO RELATED APPLICATIONS

The present application claims priority to U.S. Provisional No. 62/394,898, filed on Sep. 15, 2016.

BACKGROUND OF THE INVENTION

1. Field of the Invention

The present invention related to navigation systems and, more specifically, to a vision-inertial system for autonomous navigation of unmanned vehicles in the absence of global positioning system signals.

2. Description of the Related Art

Navigation of unmanned vehicles moving in three dimensions using onboard sensors, without inputs from external sources like global positioning systems (GPS) is challenging for several reasons. Moreover, several applications of unmanned vehicles require operations and maneuvers in environments where external navigation aids, like GPS, are not regularly available. These applications include indoor/urban operations, civilian infrastructure inspection, agriculture and aquaculture, remote sensing, wildlife tracking and conservation, package delivery, underwater and space exploration. In several of these applications, direct human involvement is difficult or infeasible. The critical challenges to be overcome for reliable autonomy of unmanned vehicles are:
  dynamic stability in the face of constraints on onboard processors, sensors and actuators;
  robustness to sensor noise and disturbance forces and torques acting;
  power use with limited onboard power resources; and
  reliance on stable communication links for operations.

Accordingly, there is a need for a system that can address these challenges.

BRIEF SUMMARY OF THE INVENTION

The present invention is an onboard robust and stable vision-inertial navigation system (ROSAVINS) that makes an unmanned vehicle truly autonomous in its navigation capabilities in the absence of external navigation aids like GPS. It is robust to the sensor noise properties of the onboard vision and inertial sensors, as well as errors in initial estimates of the position and orientation of the vehicle. This technology will enable any unmanned vehicle to autonomously navigate an unfamiliar or unknown environment. ROSAVINS is stable and robust to uncertainties in the measurement noise and dynamics of the unmanned vehicle, and does not exhibit any instabilities when sensors are changed or when sensor noise properties change over time. It is also real-time implementable with current onboard processor technology, and is stable when implemented numerically as well. These are advantages over all available technologies for onboard (GPS-denied) navigation, which have to "retuned" when sensors are changed or when large maneuvers are carried out. This retuning process makes these schemes "conditionally stable" for a limited range of motions and under certain assumptions on the sensor noise and initial uncertainty of state estimates. Unlike these conditionally stable schemes, the ROSAVINS is always stable and the estimates converge in average to the true states.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
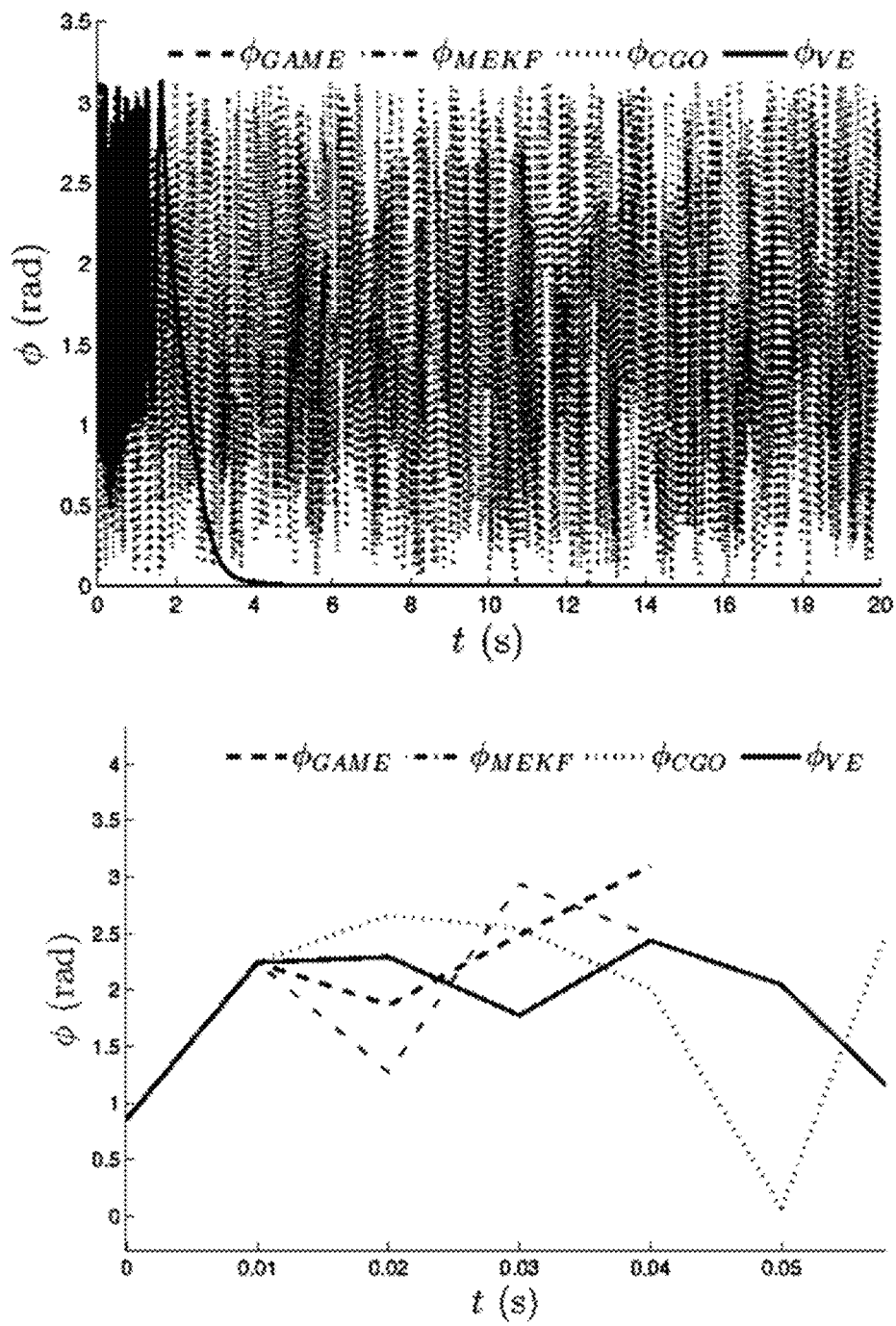
FIG. 1 is a graph of a numerical comparison of the variational estimator (VE) with some state-of-the-art attitude estimation schemes, with identical initial estimate errors and low measurement noise, for a large maneuver. Initial transient responses are shown on the right.

Referring to the figures, wherein like numerals refer to like parts throughout, there is seen in FIG. 1 an onboard robust and stable vision-inertial navigation system (ROSAVINS) that directly addresses the first two challenges above, and partly addresses the other two challenges. The navigation software will take into account coupled rotational and translational motions of maneuvering vehicles that need to carry out maneuvers during operations. These schemes will also be nonlinearly stable with a large domain of convergence, unlike schemes based on continuous feedback of quaternions or local coordinates (like Euler angles and Rodrigues parameters) used to represent rotational motion. In addition, these schemes will be continuous so that they can be implemented with actuators that can only implement continuous control schemes. Note that electric motor-operated control actuators that are commonly used in several unmanned vehicles, cannot implement discontinuous and hybrid control schemes as motor speeds cannot change instantaneously. Implementing such control schemes with motor-powered actuators requires approximating the discontinuities ("jumps" in required control effort) with continuous approximations, which in turn leads to loss of performance.

The hardware for the vision-inertial navigation system (VINS) will be based on commercial off-the-shelf (COTS) electronics for on-board processing and sensing and electronically controlled motors for actuation; all software used for programming the electronics will be open source. In this regard, smart "system-on-chip" (SoC) architectures like smartphones or mobile graphics processor units (GPUs) that have open source code, will form the core sensor/processor hardware. The primary motivation for using open source smartphones or mobile GPUs is to create a cost-, power- and mass-effective, computationally efficient, generic platform for onboard autonomous navigation. They are also able to fuse information from both inbuilt and add-on sensors; these sensors are primarily inertial sensors and cameras. This will utilize inbuilt sensors on a SoC that can interface with external sensors to provide a robust and stable autonomous vision-inertial navigation system (ROSAVINS) for unmanned vehicles. This system will be able to estimate the pose (position and orientation), translational velocity and angular velocity of the vehicle. The estimated states are used in a control law to compute control inputs by a microprocessor, to command the actuators.

The scientific objectives of the present invention are to: (1) to develop a compact, efficient, integrated hardware and software package for onboard navigation of maneuverable unmanned vehicles using a "system-on-chip" for onboard sensing and processing; (2) to verify and validate its performance through experiments that evaluate the stability of combined rotational and translational maneuvers; and (3) to implement this navigation and control system on a quadcopter unmanned aerial vehicle (UAV) as a technology demonstration. These objectives cover the transition of basic (fundamental) research to protoyping and testing of prototype through field tests. Part of the motion estimation scheme for 3D rotational motion was recently verified using an Android smartphone in a laboratory setting. To fully realize the objectives of this research, the proposed ROSAVINS will be implemented with navigation and control aspects integrated on a maneuverable vehicle like a quadcopter UAV, which will correspond to prototype testing in a laboratory environment.

Currently, there is no competing product on the market that is equivalent to the proposed compact ROSAVINS in hardware and software. The state-of-the-art products available for unmanned vehicles include inertial measurement units (IMU) (also known as inertial navigation systems, INS) in addition to a camera, which have different sensor breakouts. The processor estimates the motion states through a sensor fusion and filtering algorithm, and outputs the estimated states; usually one cannot change the sensor fusion and filtering algorithms, which may not be robust or stable. The estimated states are used by the onboard microcomputer to generate control signals based on the control law being implemented, which are then sent to the actuators.

ROSAVINS combines the sensing and processing into a single SoC platform, which obtains measurements from inertial and vision sensors, estimates the motion states by filtering out measurement noise, and computes the required control inputs to the electric motors based on the control law. These control signals are sent to a microcontroller with Accessory Development Kit (ADK) compatibility (e.g., Google ADK, Arduino MEGA ADK, etc.), where corresponding Pulse Position Modulation (PPM) signals are generated and sent to the electronic speed controller (ESC) modules to actuate the electric motors (actuators). This architecture results in both cost savings and mass savings, and also provides open source navigation and control software implemented on the SoC. Moreover, with the robust and stable control and navigation schemes implemented in this architecture, the proposed VINS becomes applicable to agile maneuverable vehicles. Finally, the software will be written in native code (NDK for Android or mobile GPU) to improve computational efficiency, as required for real-time navigation that addresses the fundamental challenges of robustness and stability within a small configurable COTS platform. Note that, besides the guaranteed robustness and stability of the proposed VINS, programming in native code in the embedded SoC environments gives superior real-time performance compared to application-level coding (using APIs), as used by Google's Project Tango. The main objective of this project is to apply robustly stable nonlinear estimation and control schemes for unmanned vehicles operating in uncertain environments developed by the PI over the past five years, to a robust and stable autonomous vision-inertial navigation system (ROSAVINS) for unmanned vehicles.

The proposed technology translation will develop a product for real-time onboard navigation and control for unmanned vehicles in GPS-denied environments, which in turn will lead to increased safety and reliability while requiring less human oversight during operations. There is a wide range of applications where greater autonomy of unmanned vehicles is beneficial. These include, e.g., civilian infrastructure like oil pipelines, dams, bridges, and nuclear power plants; disaster relief and crisis mitigation; security and surveillance; package delivery in urban areas; and monitoring of forest cover and wildlife. For safe autonomous operations, accurate motion estimation and control is critical. This is especially true for aggressively maneuvering small low-cost vehicles that are subject to wind and other disturbances. There are many applications where aggressive maneuvers are either desirable or unavoidable. For example, with tail sitters that transition between hover and level flight, the transition maneuver is necessarily aggressive. If online retailers are to realize their objective of rapidly delivering packages to their customers via unmanned aircraft, then minimizing transit time will be essential. Achieving this goal will require active maneuvering and accelerated flight through urban terrain. This research proposes to combine certain desirable features of current SoC technology with robust nonlinear estimation and control schemes, to arrive at a cost- and mass-effective VINS for unmanned vehicles. The ultimate goal is to use this project as a launching pad to commercialize the proposed ROSAVINS and market it both as a stand-alone autopilot, as well as integrated into quadcopter UAVs that will be more autonomous and reliable than those currently in the market.

A robust navigation and control system enables maneuvers with stability and precision, which will allow unmanned vehicles to be operated more reliably and autonomously for the applications mentioned earlier in this section. The market for unmanned vehicles in populated areas is severely limited currently due to safety and reliability issues. These issues relegate the use of such vehicles to applications where remote piloting is possible and over unpopulated or restricted access areas where vehicle loss poses little threat to humans. Improved safety and reliability through better navigation and control offers a dramatically expanded market opportunity in addition to improving operational capabilities of existing unmanned vehicles. The architecture of the proposed ROSAVINS offers these capabilities in a cost-effective and versatile manner. An initial market analysis for ROSAVINS targets the segment of the market for low altitude and small aerial vehicles. The UAV market is currently a $3.4B market. ROSAVINS is currently suitable for the $401 M low altitude UAV segment. UAV sales are responsible for 46% of the market (the majority of the remaining is for R&D) and navigation and control systems account for around 50% of total vehicle cost. The total addressable market for UAVs is $92 M. Besides UAVs, ROSAVINS can also be used in micro- and nano-spacecraft and small autonomous underwater vehicles (AUVs).

There is another emerging application for UAVs that could be immensely benefitted by ROSAVINS, and that is package delivery service for commercial businesses. There are many efforts in effect to advocate for this service. The Federal Aviation Administration (FAA) has been sponsoring a campaign to build a drone-owner/user registry in order to get this type of commerce off the ground. David Vos is heading Google's "Project Wing." Google is a front-runner in this application for UAVs and is expecting to have a package delivery service in full effect by 2017 [19], He is also working on the campaign with the FAA, which shows that this is in a fact a very real possibility, and will likely surface soon. Google is also planning to use UAVs not just for commerce, but also has expressed interest in humanitarian efforts such as delivering supplies to disaster-ridden areas. Amazon has also been testing drone-delivery for its ecommerce platform. They, along with Google have received permits to test this technology while it is still restricted in the United States. It is important to note that Amazon and Google are developing their own systems in-house. While both companies have significant access to capital and resources, they may lack the expertise and research background to create autonomous UAVs that could operate with the same capabilities provided by the ROSA-VINS. "Drone delivery startup" company Flirtey has recently carried out successful package deliveries in rural and urban areas using GPS. Wal-Mart is also entering this market. They have been outsourcing UAVs from the Chinese company DJI, and have expressed interest in using UAVs for delivery purposes, as well as warehouse inventory and inspection. The commercial use of UAVs is therefore highly competitive and open to disruption. As it is growing, those able to adapt and innovate will be able to gain market share quickly, which forces companies to be receptive to new technologies such as the proposed ROSAVINS. ROSAVINS could benefit these efforts in autonomous package delivery, as it allows for enhanced reliability and precision in GPS-denied environments.

The novel motion estimation scheme to be used, first introduced in the PI's recent work [10], is obtained from sensor measurements by applying the Lagrange-d'Alembert principle to an action functional of a Lagrangian of the state estimate errors, with a Rayleigh dissipation term in the velocities estimate error. This estimator behaves like a stable (dissipative) mechanical system that dissipates the "energy" in the state estimation errors, without requiring a dynamics model to propagate state estimates. The vehicle motion is globally and uniquely represented in the six-dimensional Lie group of translations and rotation in 3D Euclidean space, denoted SE. The pose of the vehicle and its kinematics is given by:

$$g = \begin{bmatrix} R & b \\ 0 & 1 \end{bmatrix} \in SE(3) \subset \mathbb{R}^{4 \times 4}, \dot{g} = g\xi^V, \text{ where} \quad (1)$$

$$\xi = \begin{bmatrix} \Omega \\ v \end{bmatrix}, \xi^V = \begin{bmatrix} \Omega^X & v \\ 0 & 0 \end{bmatrix},$$

R∈SO(3) is the attitude (rotation matrix from a vehicle-fixed frame $\mathcal{B}$ to an inertial frame $\mathcal{I}$ and b∈$\mathbb{R}^3$ is the position in inertial frame $\mathcal{I}$. $\Omega \in \mathbb{R}^3$ denotes the vehicle's angular velocity and v∈$\mathbb{R}^3$ is its translational velocity.

In addition to inertial measurements, vision sensors (cameras or lidar) can be used to measure relative positions of at least three feature points or landmarks with known inertial positions. Let $p_i$, $P_i^m \in \mathbb{R}^3$ denote the actual and measured relative positions of these points respectively in the vehicle's moving frame, for i=1, ..., k, where k≥3. Denote by $h_i = Rp_i + b \in \mathbb{R}^3$ the inertial positions of the $p_i$ and let $$p_i^m = p_i + s_i, \quad (2)$$

where $s_i \in \mathbb{R}^3$ is the vector of additive noise in the measurement $p_i^m$. Translational and angular velocity measurements are obtained directly from the sensors, or filtering the measured $p_i^m$. The vector of velocities $\xi \in \mathbb{R}^6$ is related to measured velocities by $$v_i^m = G(p_i)\xi + \varsigma_i, \text{ where } G(p_i) = [p_i^x - I] \in \mathbb{R}^{3 \times 6}, \quad (3)$$

$v_i^m \in \mathbb{R}^3$ is the measured velocity of point $p_i$ and $\varsigma_i \in \mathbb{R}^3$ is a vector of additive noise. Relative motion estimation based on a similar measurement model was given in [23, 24].

Denote the estimated pose and pose estimation error as $$\hat{g} = \begin{bmatrix} \hat{R} & \hat{b} \\ 0 & 1 \end{bmatrix}, h = g\hat{g}^{-1} = \begin{bmatrix} Q & b - Q\hat{b} \\ 0 & 1 \end{bmatrix} = \begin{bmatrix} Q & x \\ 0 & 1 \end{bmatrix} \in SE(3), \quad (4)$$

where $Q = R\hat{R}^T \in SO(3)$ is the attitude estimation error and $x = b - Q\hat{b} \in \mathbb{R}^3$ is the position estimation error. For attitude estimation, unique pairwise vector differences are defined as follows:

$$a_l^m = p_i^m - p_j^m, b_l = h_i - h_j, \text{ for } i,j=1, \ldots, n, A^m = [a_1^m \ldots a_n^m], B = [b_1 \ldots b_n] \in \mathbb{R}^{3 \times n}, \quad (5)$$

where i≠j and $$n = \binom{k}{2}.$$

Using the trace inner produce $\langle A_1, A_2 \rangle := \text{trace}(A_1^T A_2)$ on $\mathbb{R}^{3 \times n}$, one can define the potential function (Wahba's cost function [25]) for the attitude estimate:

$$\mathcal{U}_{\ell}(\hat{g}, P^m, B) = \Phi(\tfrac{1}{2} \langle B - \hat{R}A^m, (B - \hat{R}A^m)W \rangle), \quad (6)$$

where $\Phi:[0,\infty) \mapsto [0, \infty)$ is a $C^2$ class-$\mathcal{K}$ function [26] and $W = \text{diag}(w_i) \in \mathbb{R}^{n \times n}$ is a positive diagonal matrix of weight factors for the measured $a_i^m$. The potential function for the position estimate is defined as $$\mathcal{U}_{\ell}(\hat{g}, p^m, \bar{h}) = \tfrac{1}{2} k y T y = \tfrac{1}{2} k \mu \| \bar{h} - \hat{R}\bar{p}^m - \hat{b} \|^2, \quad (7)$$

where $$\bar{h} = \frac{1}{k}\sum_{i=1}^{k} \bar{h}_i, \bar{p}^m = \frac{1}{k}\sum_{i=1}^{k} p_i^m$$

is the corresponding average of measured vectors in frame $\mathcal{B}$ $y = y(\hat{g}, \bar{p}^m, \bar{h}) = \bar{h} - \hat{R}\bar{p}^m - \hat{b}$ and k is a positive scalar.

The measurement residual in the velocity measurements is given by $$\varphi(\hat{g}, \xi^m, \hat{\xi}) = \begin{bmatrix} \omega \\ v \end{bmatrix} = Ad_{\hat{g}}(\xi^m - \hat{\xi}) \text{ where} \quad (8)$$

$$\xi^m = \frac{1}{k}\left(\sum_{i=1}^{k} G^{\ddagger}(p_i^m)v_i^m\right), Ad_{\hat{g}} = \begin{bmatrix} \hat{R} & 0_{3 \times 3} \\ \hat{b}^x \hat{R} & \hat{R} \end{bmatrix}.$$

A kinetic energy-like term is also defined in terms of this measurement residual as $$\mathcal{T}(\varphi(\hat{g},\xi^m,\hat{\xi})) = \tfrac{1}{2}\varphi(\hat{g},\xi^m,\hat{\xi})^T \mathbb{I} \varphi(\hat{g},\xi^m,\hat{\xi}), \quad (9)$$

where $\mathbb{I} \in \mathbb{R}^{6 \times 6}$ is positive definite. Let $\mathcal{U}(\hat{g}, P^m, B) = \mathcal{U}_r(\hat{g} P^m, B) + \mathcal{U}(\hat{g}, P^m)$ and define the Langranian $$\mathcal{L}_{(\hat{g}, P^m, B, \varphi)} = \mathcal{T}_{(\varphi(\hat{g}, \xi^m, \hat{\xi}))} - \mathcal{U}_{(\hat{g}, P^m, B)}, \tag{10}$$

and the corresponding action functional over a time interval $[0,T]$ for $T>0$, $$\mathcal{S}(\mathcal{L}_{(\hat{g}, P^m, B, \varphi)}) = \int_0^T \mathcal{L}_{(\hat{g}, P^m, B, \varphi)} dt, \tag{11}$$

such that $\hat{g} = \hat{g}(\hat{\xi})^v$. This Langrangian can be reduced to an expression dependent only on the state estimate errors $(h, \varphi) \in SE(3) \times \mathbb{R}^6$ and B. Thereafter, introduce a Rayleigh dissipation term linear in the velocities of the form $\mathbb{D}\varphi$ where $\mathbb{D} \in \mathbb{R}^{6 \times 6} > 0$, and apply the Langrange-d'Alembert principle with reduced variations on $SE(3) \times \mathbb{R}^6$ [28, 29]

$$\delta_{h,\varphi} \mathcal{S}(\mathcal{L}_{(h,B,\varphi)}) = \int_{t_0}^T \eta^T \mathbb{D}_{,\varphi} dt \text{ where } \delta h = h\eta^v. \tag{12}$$

The resulting variational estimator can be re-expressed in terms of the state estimates, noisy measurements and known vectors B. This estimator is almost globally asymptotically stable, and robust to sensor noise. For computer implementation, the resulting variational estimator is discretized using the discrete Lagrange-d'Alembert principle. FIG. 1 compares attitude estimation errors from the (quaternion based) multiplicative extended Kalman filter (MEKF), the recent geometric approximate minimum energy (GAME) filter, a constant gain observer (CGO), and the variational estimator (VE), for identical initial state estimate errors and low measurement noise, for a given attitude maneuver. All filter gains were designed for high measurement noise and to give identical initial state estimates. Note that the VE is robustly stable and does not need to be re-tuned, unlike the other filters.

While the kinematics of the unmanned vehicle modeled as a rigid body is given by (1), the dynamics (kinetics) in the presence of external forces 0, and external torques $r_e$, is given by:

$$J\dot{\Omega} = -\Omega \times J\Omega + \tau_c + \tau_e, \tag{13}$$

$$m\dot{v} = mv \times \Omega + \varphi_c + \varphi_e, \tag{14}$$

where m is the scalar mass, $J \in \mathbb{R}^{3 \times 3}$ is the inertia matrix, and $\varphi_c, \tau_c \in \mathbb{R}^3$ denote the control force and torque, respectively. The rotational and translational dynamics (13)-(14) can be compactly represented by the forced Euler-Poincaré equation:

$$\mathbb{J}\dot{\xi} = ad_\xi^* \mathbb{J}\xi + \varphi_\varepsilon + \varphi_\alpha, \text{ where } \mathbb{J} = \begin{bmatrix} J & 0_{3\times 3} \\ 0_{3\times 3} & mI_{3\times 3} \end{bmatrix} \text{ and } \tag{15}$$

$$ad_\xi^* = (ad_\xi)^T = \begin{bmatrix} -\Omega^\times & -v^\times \\ 0 & -\Omega^\times \end{bmatrix}$$

is the co-adjoint representation of the Lie algebra se(3). Note that $(ad\zeta\eta)^v = [\zeta^v, \eta^v]$, where the matrix commutator $[X,Y] = XY - YX$ for $X, Y \in se(3)$ gives the Lie bracket.

It is assumed that all three degrees of freedom of rotational motion and at least one degree of freedom of translational motion are actuated; this is necessary for strong (global) accessibility of SE(3). For the control task, a continuous and twice differentiable reference trajectory to be tracked $g_r(i) \in SE(3)$ is first created. This trajectory is created joining successive waypoints $g_0, g_1, \ldots, g_n$ on SE(3) such that the resulting velocities $\xi_r(t)$ and accelerations $\dot{\xi}_r(t)$ along this trajectory are attainable by the actuators powering the vehicle, as follows:

$$g_r(t) = g_0 \exp(X(t)) \text{ for } X(t) \in se(3), \text{ where } X(t_0) = 0,$$
$$X(t_1) = \log(g_0^{-1} g_1), \ldots, X(t_n) = \log(g_0^{-1} g_n). \tag{16}$$

A trajectory X(t) satisfying (16) is obtained as a polynomial in time, e.g., using the De Casteliau algorithm [33]. Note that velocities, and therefore accelerations, are related to X(t), $\dot{X}(t)$ and $\ddot{X}(t)$ by the explicit formula for the matrix exponential exp:se(3)→SE(3) in terms of $ad_X$ (see e.g., [34]). Thereafter, the nominal force and torque required to follow this trajectory can be obtained by "inverting" a nominal (best known) dynamics model $$\varphi_c^0 = \mathbb{J}^0 \dot{\xi}_r - ad^*_{\xi_r} \mathbb{J}^0 \xi_r + \varphi_s^0, \tag{17}$$

which is similar to the dynamics (15) with $\mathbb{J}^0$ and $\varphi_s^0$ representing estimates of mass/inertia and external forces/torques respectively. The nominal force so obtained could be checked to see that it meets actuator constraints; time scaling of X(t) would be carried out until such constraints are met. Tracking with obstacle and collision avoidance for single and collaborative teams of vehicles will be done using artificial potential functions on SE(3), as in [12]. For tracking the reference trajectory $(g_r, \xi_r) \in SE(3) \times \mathbb{R}^6$: the following trajectory tracking errors are defined:

$$\tilde{g} = g_r^{-1} g = \begin{bmatrix} \tilde{R} & \tilde{b} \\ 0_{1 \times 3} & 1 \end{bmatrix} \text{ and } \tilde{\xi} = \xi - Ad_{g_r^{-1}} \xi_r, \tag{18}$$

such that $\dot{\tilde{g}} = \tilde{g} \tilde{\xi}^V$, with $Ad_g$ as defined in eq. (8). Let $\hat{\gamma}$ denote the vector of estimated inertia and mass parameters and let $\tilde{\gamma} = \hat{\gamma} - \gamma$. A Lyapunov candidate for the tracking errors and inertia estimate errors is:

$$V(\tilde{g}, \tilde{\xi}, \tilde{\gamma}) = \tfrac{1}{2} \tilde{\xi}^T \mathbb{J} \tilde{\xi} + \langle K, I - \tilde{R} \rangle + \tfrac{1}{2} \tilde{b}^T P \tilde{b} + \tfrac{1}{2} \tilde{\gamma}^T Q \tilde{\gamma}, \tag{19}$$

where $K \in \mathbb{R}^{3 \times 3}$ is a positive diagonal matrix with non-identical diagonal entries, $P \in \mathbb{R}^{3 \times 3}$ and $Q \in \mathbb{R}^{7 \times 7}$ are positive definite matrices. The resulting control scheme obtained from the ensuing Lyapunov analysis will generalize the inertia-free robust and stable attitude tracking control scheme of [35] on $SO(3) \times \mathbb{R}^3$, to a mass and inertia-free pose tracking scheme on $SE(3) \times \mathbb{R}^6$ with similar properties of stability and robustness to uncertainties in mass, inertia and external disturbance forces/torques. In the control scheme so obtained, the actual states (g, $\xi$) will be replaced by their estimates ($\hat{g}, \hat{\xi}$), with the filter (estimator) gains W, $\mathbb{I}, \mathbb{D}$ and control gains K, P, Q set so that filter convergence is faster than controller convergence. Note that both filter and controller are of proportional-derivative (PD) type, which makes it easy to set the gain values based on the expected range of mass and inertia values for the unmanned vehicle.

The overall architecture of the proposed ROSAVINS autopilot is the hardware-software combination of autonomous state/pose estimation, trajectory generation, guidance and control of the UAV platform as per the mission objectives implemented on/using the hardware mentioned in table 1.

The hardware requirements for ROSAVINS are tabulated in Table 1.

TABLE 1

Hardware requirements for ROSAVINS autopilot.

| Optical (vision) Sensors | Inertial Measurement Unit(IMU) | |
|---|---|---|
| ❶ LIDAR sensor | ❹ Accelerometer | |
| ❷ Image sensor | ❺ Gyroscope | |
| ❸ Flow + sonar sensor | ❻ Magnetometer | |
| Onboard Computer | Micro-controller | Telemetry |
| Clock ≥720 MHz | PWM output ≥4 | Transceiver |
| RAM ≥1 GB | I2C and/or UART | Wi-Fi |

Figure 2:
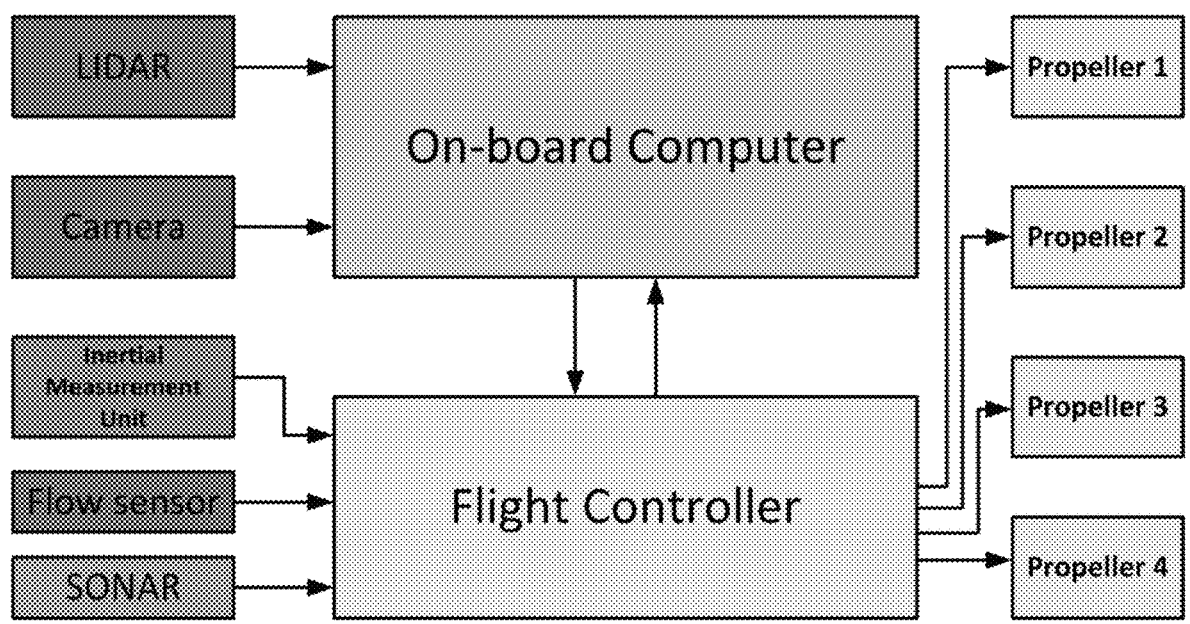
FIG. 2 is the architecture of ROSAVINS autopilot system.
Figure 3:
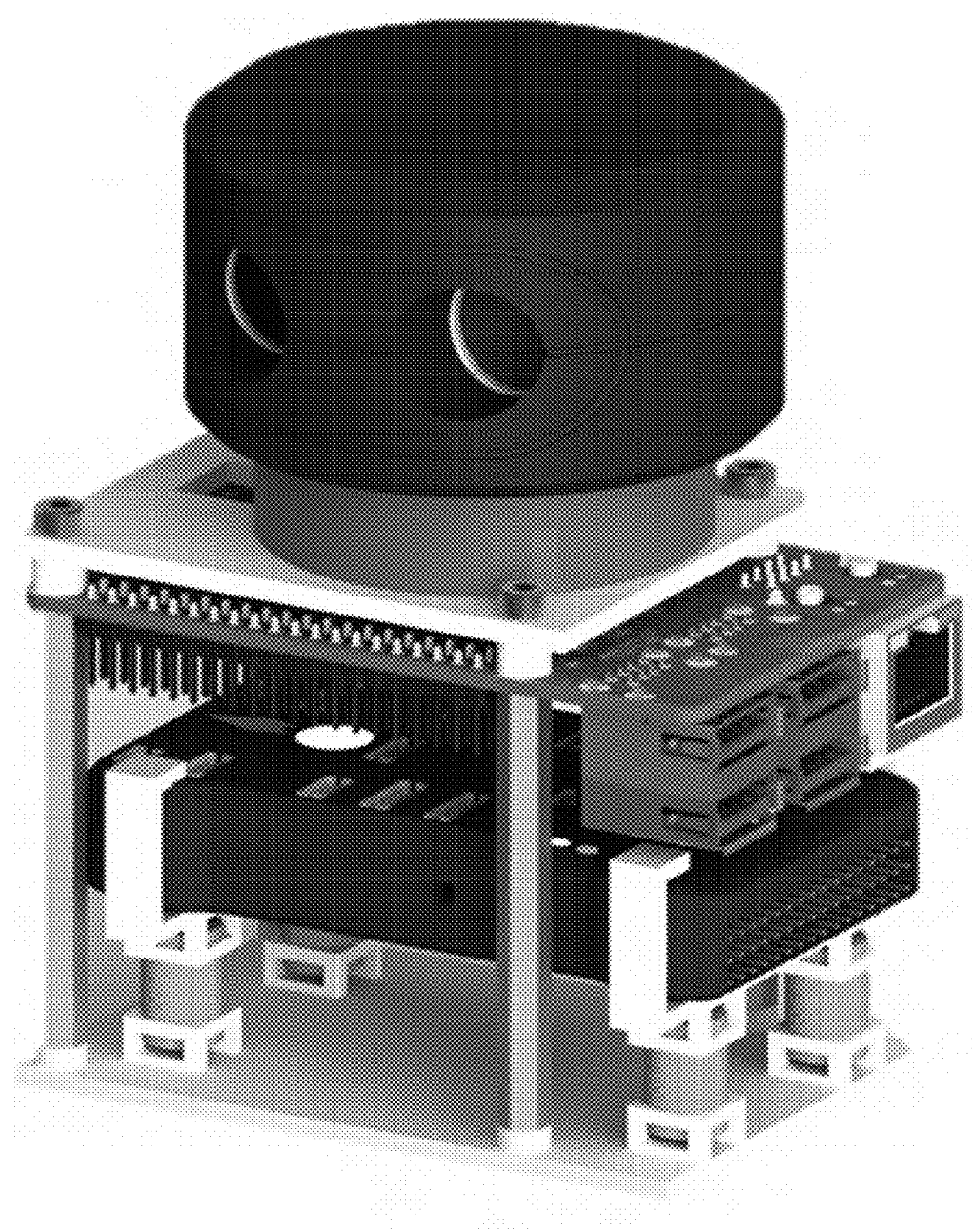
FIG. 3 is a bare-minimum hardware assembly of ROSAVINS autopilot.
Figure 7:
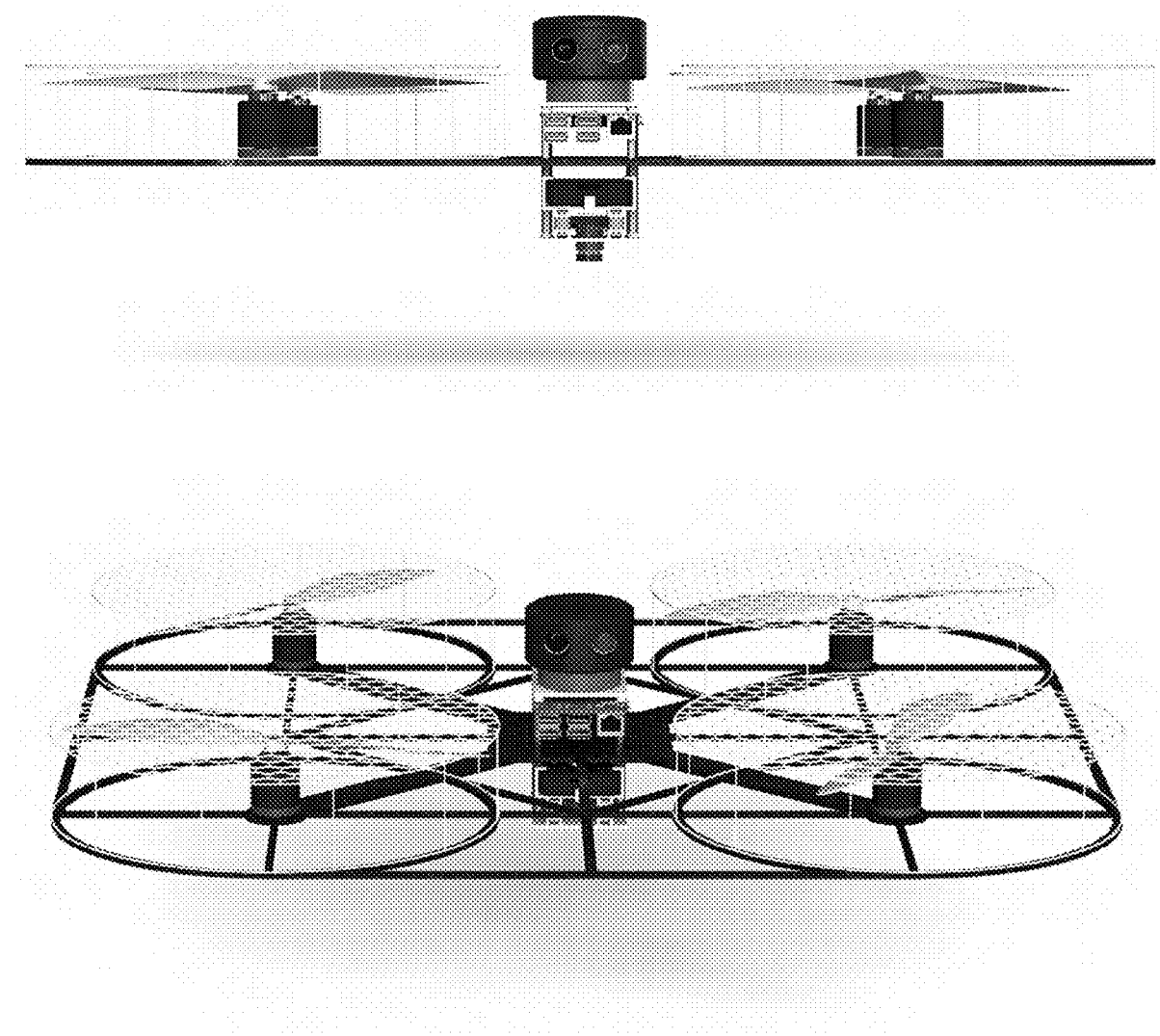
FIG. 7 is the schematic rendering of an indoor quadcopter UAV equipped with the ROSAVINS autopilot.

The ROSAVINS hardware is a combination of components from open-hardware project, commercial off the shelf (COTS) components and generic breakouts geared to provide full autonomy at low cost. Sensors and actuators are interfaced with the flight controller (microcontroller) and algorithmically fused on the onboard computer. The onboard computer processes the sensor data and commands the microcontroller to generate required control effort for the mission. A bare-minimum hardware sensor configuration for ROSAVINS includes a LIDAR, accelerometer, gyroscope, magnetometer and laser or ultrasonic rangefinder. Of these sensors, accelerometer, gyro and magnetometer sensor are algorithmically fused as an Inertial Measurement Unit (IMU). LIDAR scan data is fused with the IMU data and projected on the horizontal plane. The UAV is localized in an unknown environment by combining the planar 2D Simultaneous Mapping and Localization (SLAM) process and the full 3D Variational Pose Estimator (VPE). Range sensor is used for altitude measurements and to maintain a safe hovering altitude above the floor and below the ceiling in an unknown indoor environment. Image sensor is used for feature, corner and edge detection in the sensor's field of view and they are used by trajectory generation subsystem. For the processor, an open-source computing hardware with clock speed and RAM greater than 720 MHz and 1 GB respectively, can be used for implementing the ROSAVINS algorithms. The onboard computer will be for running the middleware and to handle the image processing part of ROSAVINS. The microcontroller bridges the hardware part with the ROSAVINS software through its IO ports (PWM, DART, I2C etc.). If brushless DC motors (BLDC) are used as the actuators, electric speed controllers (ESC) are required to drive the motors through electric commutation. Additional sensors like thermographic imagers, proximity and flow sensors, etc., can be used in conjunction with the above ROSAVINS bare-minimum sensor configuration for real time computer vision along with subroutines, including image processing, object and corner detection. The system architecture of ROSAVINS as given in FIG. 2 can be prototyped with bare-minimum hardware with COTS components as shown in FIG. 3. An unibody, durable quadcopter airframe made out of carbon fiber material is used as the ROSAVINS platform. The overall concept of ROSAVINS mounted on a multirotor platform is shown in FIG. 7.

Figure 4:
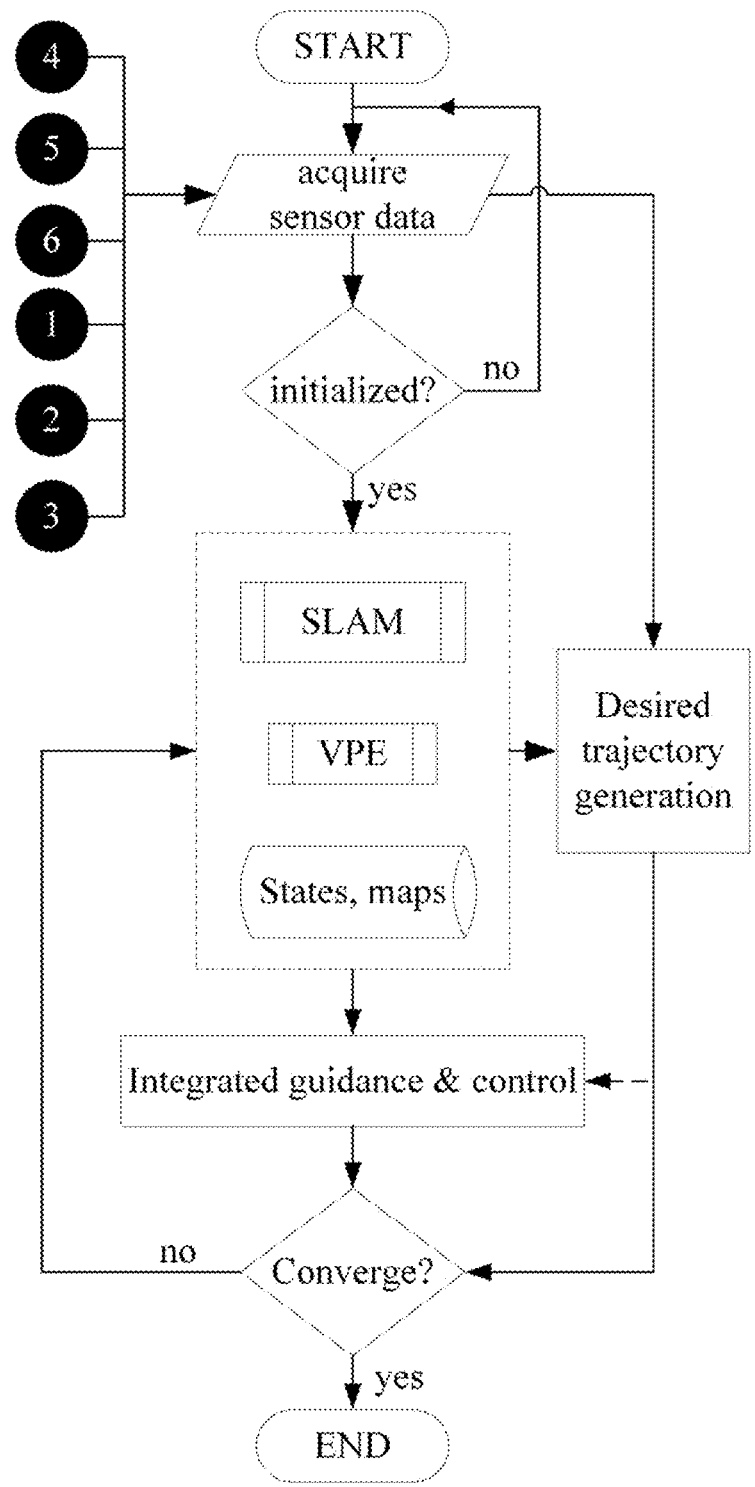
FIG. 4 is the core process flow of ROSAVINS.
Figure 5:
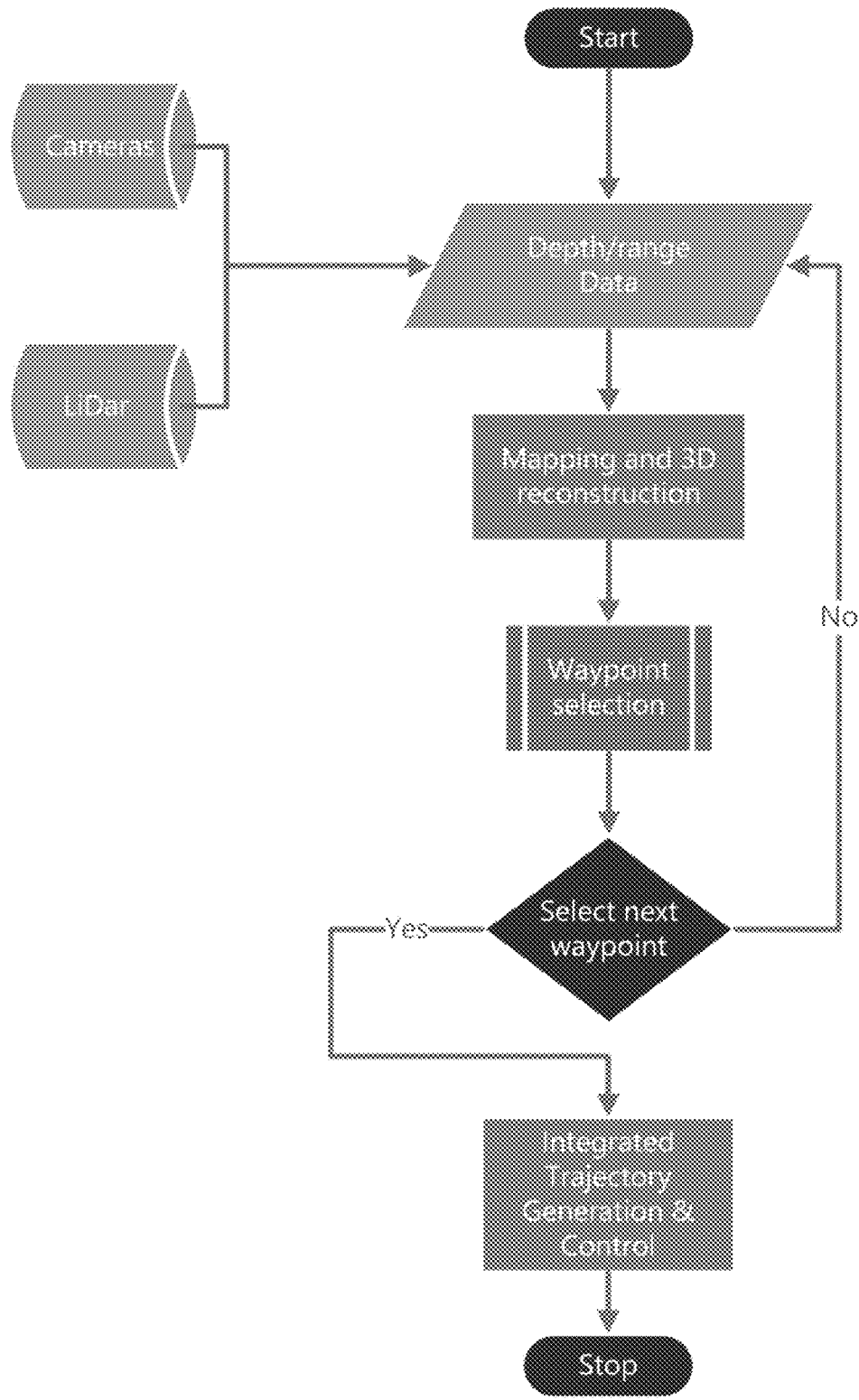
FIG. 5 is the trajectory generation sub-routine of ROSAVINS.
Figure 6:
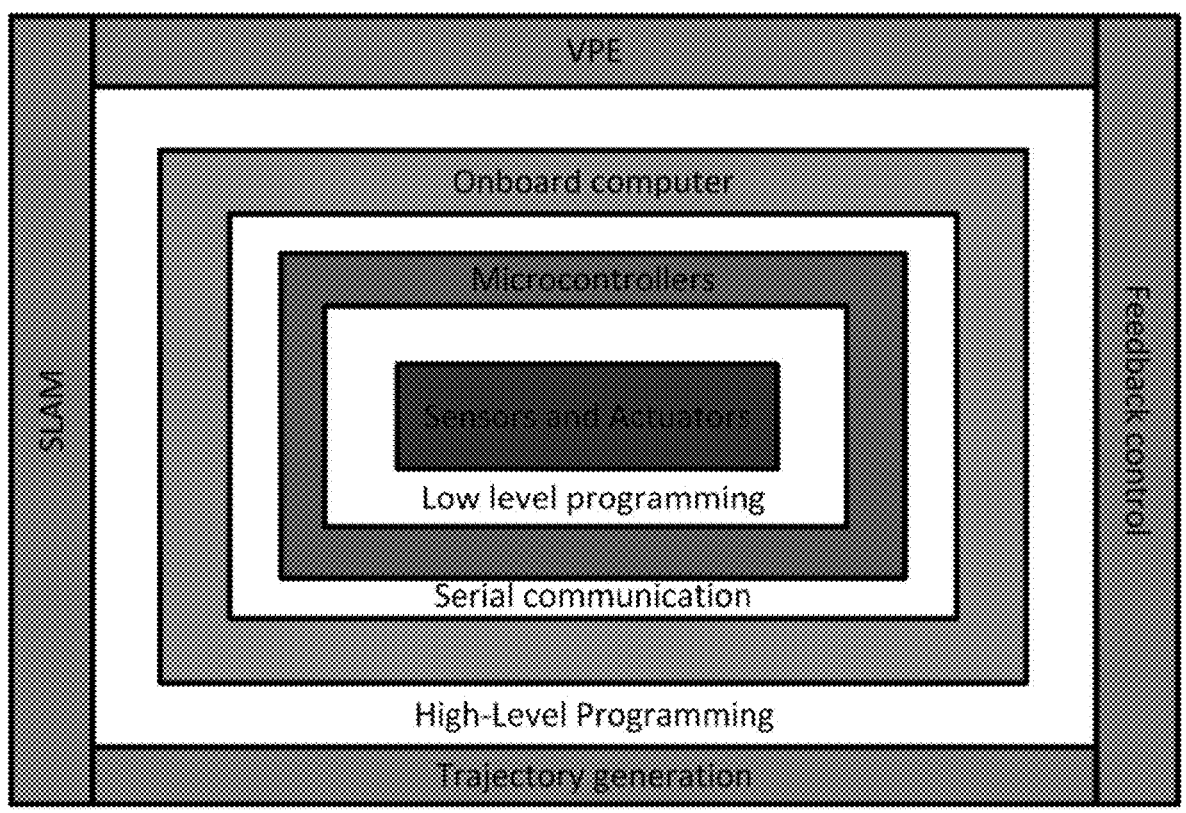
FIG. 6 is the software architecture of ROSAVINS.

The key element of ROSAVINS is the novel algorithms for pose estimation, integrated trajectory generation and control in the absence of external inputs like GPS. The software architecture of ROSAVINS target different abstraction layers through high and/or low level programs and cross-assemblers, as shown in the right half of FIG. 6. Data from various sensors are acquired by the microcontroller through embedded programming and stored in the buffer memory. The buffered data from the microcontroller are sent to the onboard computer through serial interfaces. Core routines of ROSAVINS such as SLAM, VPE, integrated guidance and feedback control algorithms are implemented on the onboard computer via high-level programming language. Each core routine involves various subroutines to obtain the desired values; for example, raw data from the accelerometer, gyroscope and magnetometer are filtered using a low pass filter in the microcontroller and fed into variational pose estimator routine running in the onboard computer. The system is initialized with data acquired from the sensors. The data acquisition routine is looped till required data streams are stored in the buffer and these are used by the core routines for estimating the system states. The resulting flowchart of ROSAVINS core routines is shown in FIG. 4. The desired trajectory generation subsystem which shares the sensor data is executed as shown in FIG. 5.

The ROSAVINS product may be developed in the smallest form factor appropriate for the multirotor UAV platform. The unibody carbon fiber airframe with 3D printed propeller covering increases the durability of the product while lowering the overall weight. A schematic rendering of an indoor multirotor quadcopter UAV equipped with the ROSAVINS autopilot is shown in FIG. 7.

Complete verification and validation of the ROSAVINS autopilot in 6 DOF translational plus rotational motion may be carried out on a quadcopter micro-aerial vehicle (MAV).

What is claimed is:

1. A robust and stable vision-inertial navigation system for an unmanned vehicle, comprising:
    a vision sensor positioned onboard the vehicle;
    an inertial sensor positioned onboard the vehicle;
    a controller positioned on board the vehicle and interconnected to the vision sensor and inertial sensor, wherein the controller is programmed to acquire data from the vision sensor and data from the inertial sensor, to generate a trajectory from the acquired data from the vision sensor and data from the inertial sensor, and to control the movement of the vehicle according to the generated trajectory according to a nonlinear control scheme that fuses the data from the vision sensor and the data from the inertial sensor to ensure that the movement of the vehicle converges with the generated trajectory.

2. The system of claim 1, wherein the vehicle has four propellers.

3. The system of claim 2, wherein the controller is programmed to acquire data from vision sensor and inertial sensor for a predetermined buffer time prior to generating the trajectory from the acquired data.

4. The system of claim 3, wherein the controller is programmed to perform pose estimation.

* * * * *